United States Patent [19]

Maxey

[11] 4,354,459
[45] Oct. 19, 1982

[54] NON-THROTTLING CONTROL APPARATUS FOR SPARK IGNITION INTERNAL COMBUSTION ENGINES

[76] Inventor: Joel W. Maxey, 447 Palmtree Dr., Bradenton, Fla. 33507

[21] Appl. No.: 50,483

[22] Filed: Jun. 20, 1979

[51] Int. Cl.³ .................................................. F01L 7/00
[52] U.S. Cl. ........................ 123/80 BA; 123/190 A; 123/79 R; 123/405; 474/109
[58] Field of Search ............ 123/90.15, 80 R, 80 BA, 123/190 A, 190 R, 79 R, 347, 348, 402, 405, 453; 474/101, 109, 138

[56] References Cited

U.S. PATENT DOCUMENTS

| | | | |
|---|---|---|---|
| 1,094,329 | 4/1914 | Henderson | 123/80 BA |
| 1,107,382 | 8/1914 | Tygard | 123/80 BA |
| 1,246,912 | 11/1917 | Grant | 123/190 A |
| 1,794,061 | 2/1931 | Culver | 123/190 A |
| 2,202,761 | 5/1940 | Fiedler | 123/190 A |
| 2,692,588 | 10/1954 | Cathers | 123/90.15 |
| 3,010,442 | 11/1961 | Hamilton | 123/453 |
| 3,203,409 | 8/1965 | Allen | 123/80 BA |
| 3,683,875 | 8/1972 | Chadwick | 123/90.15 |
| 3,888,217 | 6/1975 | Hisserich | 123/90.15 |
| 4,174,683 | 11/1979 | Vivian | 123/90.15 |

Primary Examiner—Craig R. Feinberg
Assistant Examiner—W. R. Wolfe
Attorney, Agent, or Firm—Ronald E. Smith

[57] ABSTRACT

A rotary valve assembly will be utilized on internal combustion engines for regulating air-fuel mixture from a carburetor or other fuel injection system entering the cylinders of either two stroke or four stroke spark ignition engines serving to improve the part-load fuel efficiency of such engines by minimizing the pumping losses. This increase in efficiency is accomplished by substituting what is termed "time-duration-modulation" control for the present day "throttled" or "resistive" intake control now used to regulate engine power output. The rotary valve structure employs a hollow, or open sleeve, or tubular multi-port structure comprising the rotary valve, with an outlet for each cylinder, operating at fifteen (15) p.s.i. maximum differential pressure and relatively low temperatures, connected in series with presently used poppet or port type intake valves. Rotary valve timing or phase control is accomplished with a multi-pulley belt drive system.

7 Claims, 12 Drawing Figures

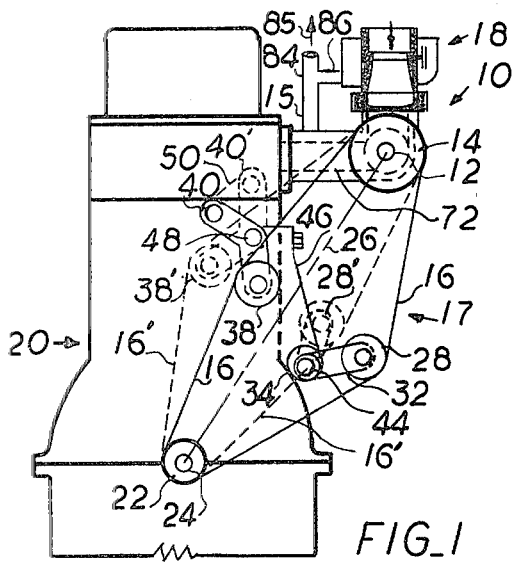
FIG_1
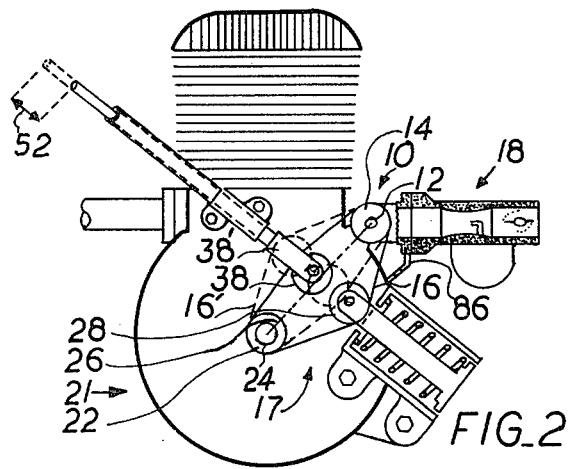
FIG_2
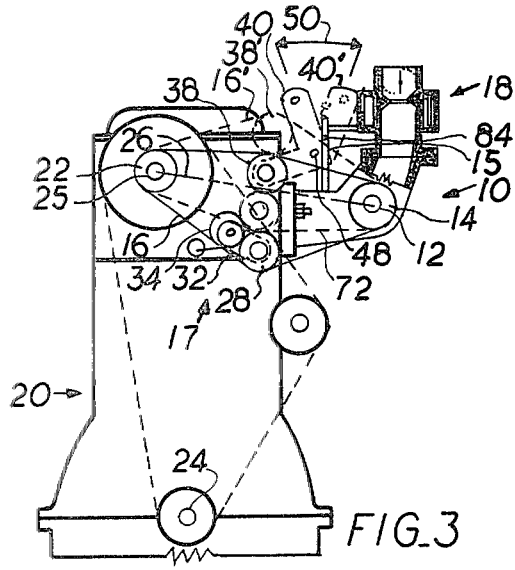
FIG_3
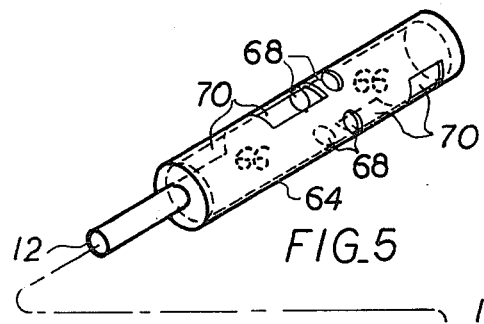
FIG_5
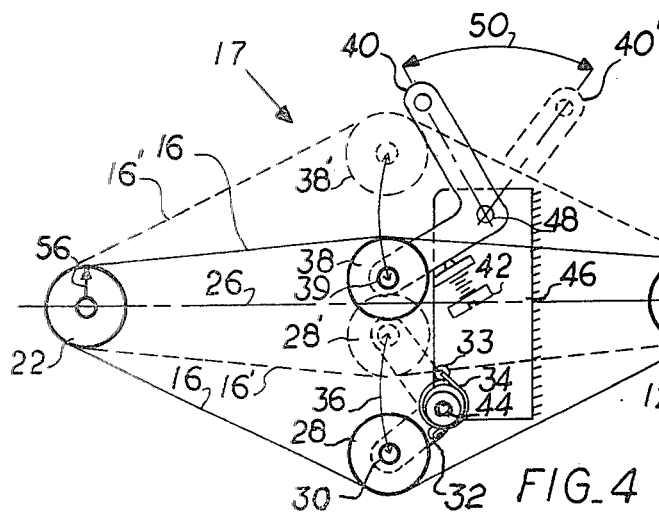
FIG_4
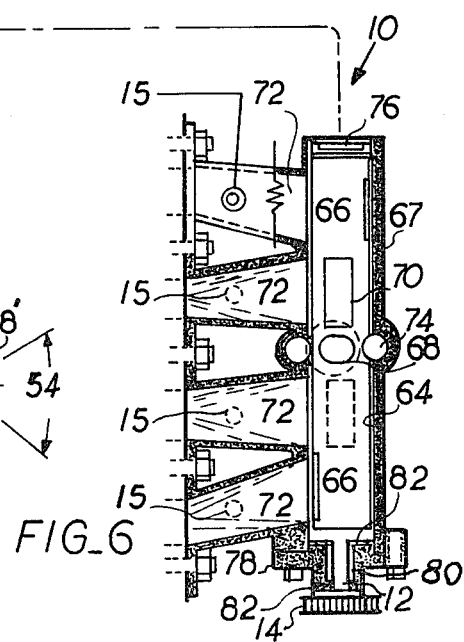
FIG_6

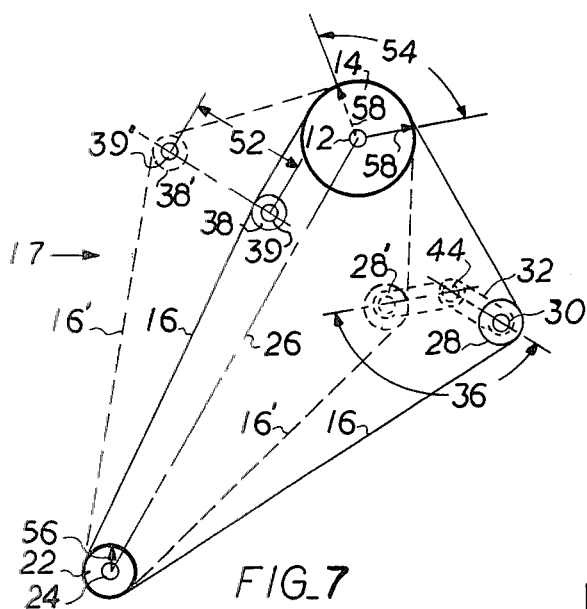
FIG_7
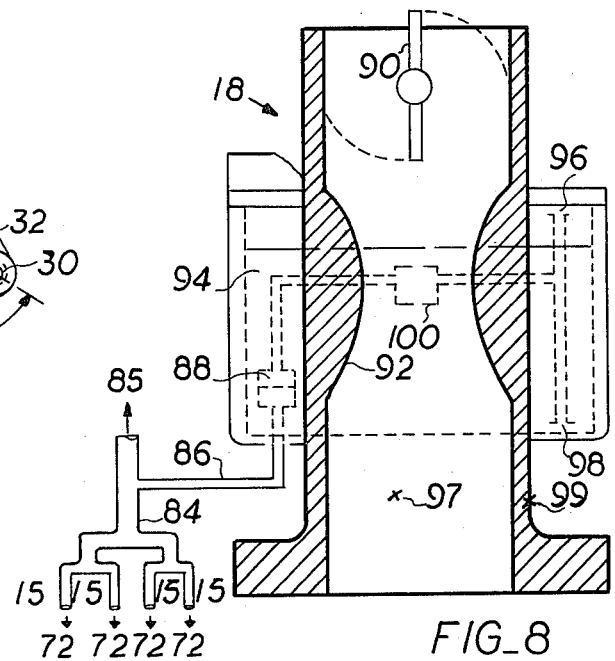
FIG_8
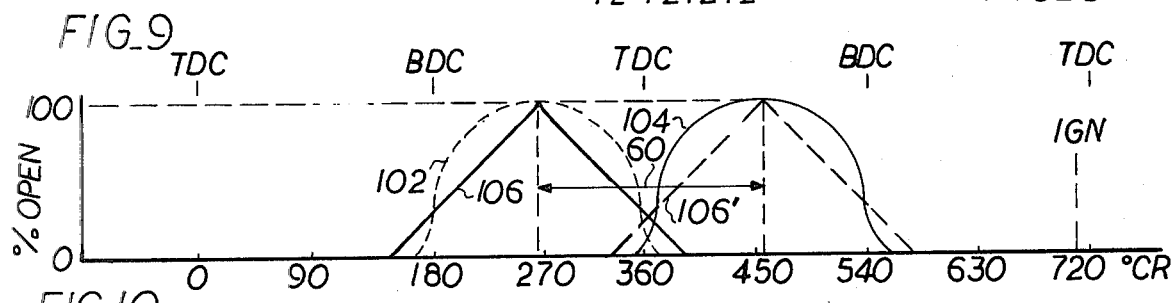
FIG_9
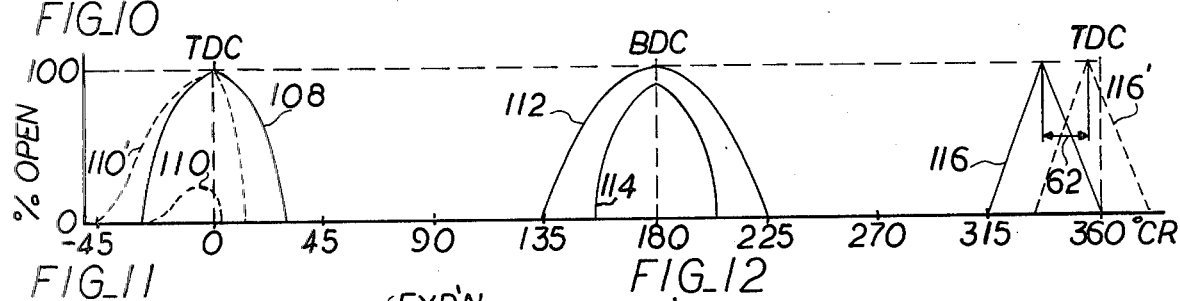
FIG_10
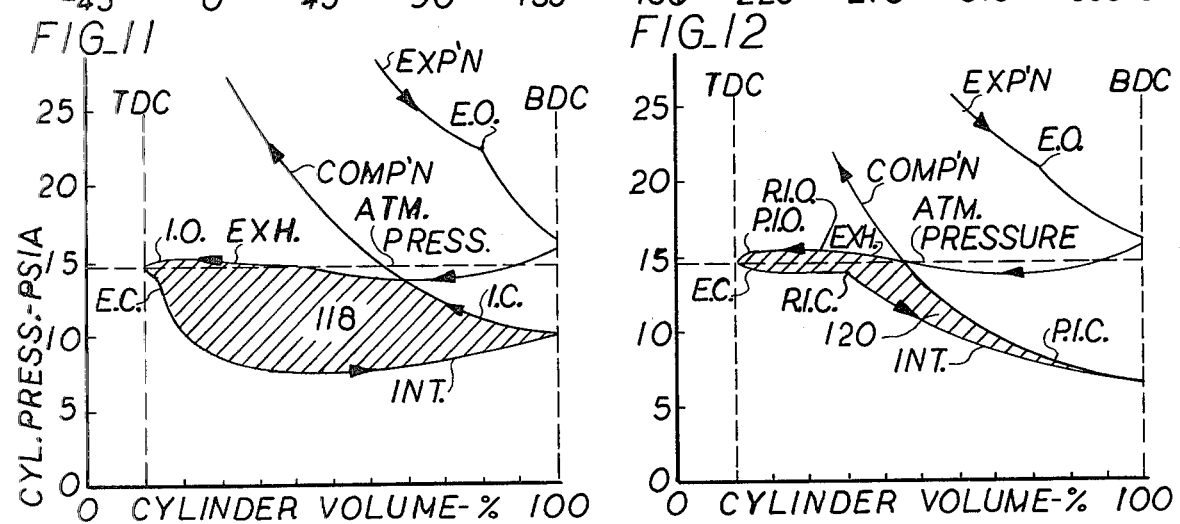
FIG_11
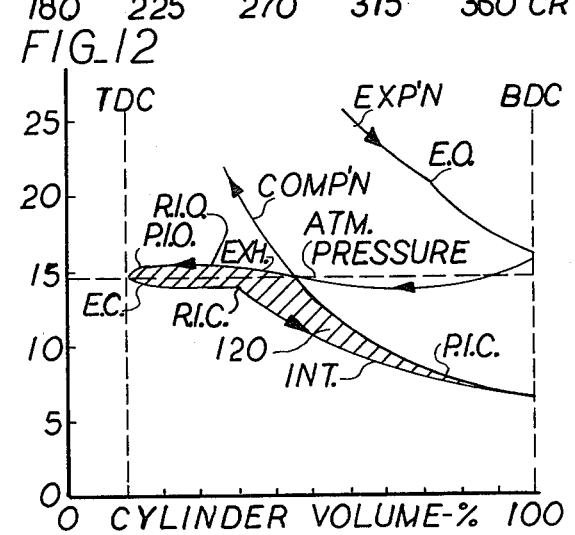
FIG_12

NON-THROTTLING CONTROL APPARATUS FOR SPARK IGNITION INTERNAL COMBUSTION ENGINES

BACKGROUND OF THE INVENTION

1. Field of the Invention

This invention relates to a rotary valve mechanism for improving part-load fuel efficiency of automobile and other throttled, spark ignition internal combustion engines of both the two stroke and four stroke cycle types by minimizing the pumping losses or negative work even below the corresponding loss levels in compression ignition or "diesel" engines. It corresponds in the steam engine field to the introduction of the Stephenson variable inlet cut-off valve.

2. Description of the Prior Art

Throttled spark-ignition internal combustion engine technology is well known in the art and of course is extremely popular and most familar to the average person as the power source of conventional automobiles and like vehicles. However, in the operation of the internal combustion engine, one of the most complex components or sub-assemblies in such an engine, particularly in automotive applications, is the carburetor.

In an automobile engine of the internal combustion type, the carburetor throttle is adjusted by the driver, through manipulation of the accelerator pedal, to a position which gives the desired power output. This throttling drops the engine intake pressure below atmospheric level thereby decreasing the engine performance to the required value. After the combustion process is completed in the various cylinders of the engine, the exhaust must be pumped out of such cylinders against atmospheric pressure. This in turn of course requires work to be expended to accomplish the flow of such exhaust against the existing atmospheric pressure on the exterior of the combustion cylinders. The pressure energy lost by the carburetor restriction must be replaced by work which would otherwise be available as useful power output at the flywheel if such energy were not required in exhausting the combustion cylinders. The above problems of course do not apply to diesel type engines which have no air throttle and therefore do not have this flow-work loss to reduce their efficiency.

However, generally such diesel type engines while commonly used in automobiles and like vehicles are inherently much more expensive and have reduced performance characteristics compacted to conventional spark ignition internal combustion engines. They must compress the air charge to high pressures and to ignition temperature whether at full load or at idling conditions.

To overcome the problem of throttling resulting in pumping losses or negative work while exhausting the cylinders, devices or assemblies exist in the prior art which are directed specifically to this problem. Particularly the U.S. Pat. No. 3,203,409 to Allen shows an apparatus for controlling the air taken into the combustion chamber of an I.C. engine through the use of a rotary valve. The rotation of the rotary valve is varied relative to the rotation of the crank shaft through the provision of a differential gear box. This differential gear box is placed in driving relation to the driving axle shaft of the various rotary valves associated with each of the cylinders. Physical manipulation of a lever varies the operational position of the gears within the differential gear box thereby causing a change in the relative rotation of the individual rotary valves and the crank shaft, dependent upon the power demands of the engine. While possibly operable, the specific mechanism and operational characteristics of Allen through the provision of the gear box assembly, valve axle and relatively large diameter rotor, etc. seem overly complex as well as providing questionable operating characteristics for a practical application.

Accordingly, there is a need to solve the throttling problem associated with spark-ignition type I. C. engines particularly in automotive uses. It is acknowledged that similar savings could be produced by separately programming the operating characteristics of the present poppet intake valves or ports of the engine. However, the cost and complexity of such an operation would be prohibitively great. Since it is also well recognized that the I. C. engine particularly for automotive uses, seldom operates at a full load capacity, considerable improvement in average fuel economy could be accomplished by operating the spark-ignition engine at only the indicated mean effective pressures required to maintain the capacity desired. The resulting savings in pumping loss would thus be maximum at low speeds and low loads and would of course be decreased to zero at full load conditions.

Such a structural modification of spark-ignition engines similar to "and-gating" in electronics should be dependable in operation, less costly to produce, and require less modification to the present basic engine designs than prior art known methods and should accomplish the same effect as programming of the operations of the poppet or port type intake valves with much less cost involved.

SUMMARY OF THE INVENTION

This invention is directed towards a rotary valve structure comprising a hollow, open sleeve or tubular configuration having a somewhat extended longitudinal dimension so as to define the rotary valve structure. The rotary valve has a multi-port construction with an outlet for each cylinder, operating at 15 p.s.i. maximum differential pressure and relatively low temperatures wherein each outlet or port is connected in series with the presently used poppet or port type intake valve and establishes fluid flow communication, in regulated fashion, between the carburetor and the intake valves or ports.

For the purpose of clarity first consideration relating to the operation of the subject invention will be directed to the discussion of a single cylinder which will be representative of all cylinders of a multi-cylinder engine. The rotary valve structure of the present invention would be opened once per cycle at an early enough time to cause no appreciable restriction of the air-fuel mixture flow into the poppet intake valve, considering the four-stroke engine first. The closing time of the rotary valve would be continuously variable by the driver or operator by his ability to cut off this flow into the cylinder even though the poppet intake valve remains open. This has the effect of adjusting the brake means effective pressure in the cylinder and thereby the engine power output to the desired value.

Very early closing of the rotary valve would allow only a small amount of mixture into the cylinder for idling conditions. By selectively delaying the closing of the rotary valve up to and including the time at which the poppet intake valve closes, any other variable load up to full power could be selected by the driver or operator. Under any partial load operation, the cylinder would be charged at nearly atmospheric pressure until enough mixture (air or fuel-air) had entered to perform the work required. When the rotary valve is closed, the mixture trapped in the cylinder and its poppet valve port would be expanded by the piston motion during the balance of the intake stroke. The poppet intake valve would then close and the usual compression, ignition, expansion and exhaust functions would follow in the conventional manner. The higher vacuum obtained in the cylinder and intake port during the end of the intake stroke will cause more complete vaporization and mixing of the fuel and air, thus allowing higher air-fuel ratios and lower vapor pressure fuel to be used for even greater fuel efficiency.

The application of this method of load control to the two-stroke cycle engine could require much shorter duration of opening of the rotary valve. Since in this case the rotary valve turns at crank-shaft speed due to its interconnection to the crank shaft through structural linkage which will be explained in detail hereinafter, its duration of opening would need to be fitted to the present pistonported or reed valve capacity of the engine. At full load conditions the rotary valve would close at or near the top dead center position time, rather than at an angle past T.D.C. equal to its opening angle before T.D.C. The volumetric pumping capacity of the crank case would be raised, thus increasing the power capacity of the engine.

In order to accomplish proper manipulation and positioning of the rotary valve structure set forth above, proper phase-shifting of such valve has to be accomplished. The mechanism or structural components used to enable the operator to allow the continuous varying of the closing time of the rotary valve with respect to poppet intake or intake port timing will be set forth hereinafter. Such phase shifting assembly comprises, preferably, a drive or "timing" belt very resistant to lengthwise extension and a plurality of pulleys disposed in interconnection to the timing belt in such a manner as to prevent relative slippage therebetween. Such elimination of slippage could occur through the provision of a plurality of continuously disposed teeth on the interior driving portion of the timing belt and similar configurations of the periphery of the pulleys for receiving such toothed structures. One such pulley would be disposed on the driving shaft which would comprise either the crank shaft or other shaft which is driven at constant ratio by the crank shaft in normal operation of the engine. Another of the pulleys would be disposed on the rotary valve itself wherein the pulley associated with the valve would have a specific number of "teeth" to rotate the valve at one-half of the crank shaft speed when utilized in combination with a four-stroke cycle engine. The rotation of the crank shaft relative to the rotary valve structure of the present invention, when used in combination with a two-stroke cycle engine, would be a one to one ration. Another pulley would serve as an idler pulley to assure the tension of the belt on one side of a "center line" defined between the axis of rotation of the driving shaft (crank shaft or other shaft driven at a constant ratio to the crank shaft) and the axis of rotation of the rotary valve of the present invention. Another and final pulley structure would serve as a second idler pulley on the "slack" side of the timing belt wherein such second idler pulley would be rotatably mounted on a swingably or slidably movable carrier shaft so connected to the accelerator pedal or control lever manipulated by the operator so as to give somewhat proportional motion between the input signal and the position of this latter or second idler pulley, which may be termed the control pulley.

Upon manipulation from the operator of the vehicle either through depression of the accelerator pedal or manipulation of the control lever, etc. the tensioning idler pulley will move toward the line of centers previously set forth, defined between the driving and driven shafts. This will in effect move part of the belt in its continuous path of travel from the "tension" side to the "slack" or control side of the line-of-centers. This in turn will effect the retarding of the position of the rotary valve with respect to the position of the driving shaft and increase the power output of the engine. Decreasing the signal through release of the accelerator pedal or return manipulation of the control lever by the operator would have the reverse effect on positioning of the control idler pulley relative to the line-of-centers. This in turn would readvance the rotary valve timing and reduce the power output of the engine.

The above discussion is based on "normally aspirated" or unsupercharged engine designs. However, the same savings of "negative work" and resultant increases in efficiency can be obtained by applying the subject invention to supercharged engines, whether of mechanical or exhaust turbine drive types, if they are "throttle controlled."

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is an end view of the rotary valve structure and accompanying phase shifting assembly used with a four-stroke cycle spark ignition engine.

FIG. 2 is an end view of the structure of the present invention used or mounted on an in-line, two-stroke cycle spark ignition engine.

FIG. 3 is an end view of an in-line four-stroke cycle spark ignition engine showing the rotary valve and phase shifting mechanism of the present invention driven by a cam shaft serving as the driving shaft of the phase shift mechanism.

FIG. 4 is an enlarged, partially schematic view of the phase shifting mechanism in a one-to-one drive load control mechanism.

FIG. 5 is an isometric view of the structural detail of the valve rotor of the present invention.

FIG. 6 is a top view, in partial section of the four cylinder rotary valve assembly.

FIG. 7 is a schematic representation of the phase shifting mechanism as in FIG. 1 differing in that mechanism is not at the middle of line-of-centers and is a mixture of linear and rotary movements, to show flexibility of mechanism to fit space requirements.

FIG. 8 is a detailed view in partial vertical section of a down draft carburetor indicating certain modifications necessary for use with the present invention to accomplish non-throttling operations.

FIGS. 9 and 10 are linear timing diagrams showing typical intake and exhaust valve opening curves for four-stroke cycle and two-stroke cycle engines respectively.

FIGS. 11 and 12 are combustion chamber low pressure versus volume diagrams for four-stroke cycle throttled and non-throttled spark ignition engines.

Similar reference characters refer to similar parts throughout the several views of the drawings.

DETAILED DESCRIPTION OF THE PREFERRED EMBODIMENT

This invention is directed to a multi-ported rotary valve assembly generally indicated as 10 provided with a driven shaft 12 so as to rotate therewith. A first pulley 14 serves to drive shaft 12 and the rotary valve structure 10 through its engagement with the timing belt 16 serving as part of the phase control mechanism generally indicated in FIGS. 1, 2, 3, 4, and 7 as 17. As will be explained in greater detail hereinafter the phase controlling of the rotary valve is used to program the flow of air or air-fuel mixture delivered from a simplified carburetor assembly generally indicated as 18. This air-fuel mixture travels from the carburetor 18 to the poppet intake valve ports of a four-stroke cycle, spark ignition engine 20 (FIGS. 1 and 3) or the crank case inlet ports of a two-stroke cycle, spark ignition engine 21 (FIG. 2). The change of phase of the rotary valve 10 with respect to a driving pulley 22 mounted on a crank shaft 24 (FIG. 1) or on another driving shaft 25 rotating in constant ratio to the crank shaft 24 (FIG. 3), of the engines 20 and 21 respectively is accomplished by transferring part of the length of the belt 16, as it travels, from one side of a line-of-centers 26 (FIG. 1, 3, 4 and 7) to the other side of this line-of-centers. The line-of-centers 26 is defined by an imaginary straight line between the driving pulley 22 associated with the driving shaft (either the crank shaft or driving shaft rotating at constant ratio) 24 or 25 respectively, and the driven pulley 14 mounted to rotate with the rotary valve 10.

The sequence of operation of the phase changing mechanism generally indicated as 17 in FIGS. 1, 2, 3, 4 and 7 may be explained by considering the conventional three pulley, constant phase timing belt drive, with one spring loaded take-up or idler pulley. Likewise, in the subject phase change mechanism the driver pulley 22 and the driven pulley 14 are interconnected to an adjustable idler or tensioning pulley 28 mounted on a support shaft 30. This support shaft 30 can be repositioned to produce more or less tension of the drive belt 16. The tensioning pulley 28 and shaft 30 are preferably mounted on a movable linkage including movable arm 32. A tensioning spring or biasing means 34 is disposed to maintain the tension of the timing belt 16 nearly constant over long periods of time regardless of wear, thermal expansion and contraction, etc. Preferably the spring or biasing means 34 is a low rate type spring, so the tension in the timing belt 16 would only increase a small percentage throughout a relatively large path of travel indicated in FIGS. 4 and 7 as 36. This path of travel is the distance the linkage or movable arm 32 moves as it carries tension pulley 28 to position 28'. It should be noted that this spring tension continuously biases the mechanism toward the idle position. Unique to the subject phase change mechanism is a fourth or control pulley 38, disposed also in interconnection with the timing belt 16 and physically positioned on the opposite side of the line of centers 26 between driving pulley 22 and driven pulley 14. The control pulley 38 is rotably mounted on a shaft 39 which in turn is mounted on control arm 40, which is able to be displaced or rotated through a path of travel indicated by angle 50 from a position indicated in solid lines 40 to a position indicated in dotted lines 40'. This movement serves to position control pulley 38 from its idle position 40, controlled by adjustable stop means 42, to its full load position 38' with tensioning pulley arm against full load stop 33. In making its traverse, the pulley 38 causes a part of the length of the timing belt 16 during its continuous travel, to be conveyed to the other side of the line of centers 26 and the spring element or biasing means 34 to be deformed by the positioning or the repositioning of the swing arm shaft support 32. This allows tension pulley 28 to move to position indicated in dotted lines as 28'.

The support shaft 44 serves to allow pivotal movement of tension pulley 28 and is supported on a bracket 46. This support bracket further serves to support or have mounted thereon control arm 40 through provision of support shaft 48 mounted thereon. This mounting of course through the movement of control arm 40 causes the repositioning of the control pulley 38 as described above.

The change of the length of the timing belt 16 from one side of the line of centers 26 between pulleys 22 and 14 to the other side thereof caused by movement of the control arm 40 through a path of travel is indicated generally as 50 (FIGS. 1, 3 & 4) and the path of travel 52 (for an in-line movement of control pulley) is shown in FIGS. 2 and 7. This movement causes a change of phase or angular relationship 54 to occur between driving pulley 22 and driven pulley 14 as shown in FIGS. 4 and 7. For purposes of clarity it should be noted that the radial arrow 56 on pulley 22 is held stationary while the radial arrow 58 on driven pulley 14 moves from its solid position, as shown (for idle), to its dotted position 58' (for full load). The effect of this change of phase is shown in FIG. 9 as shift 60 and in FIG. 10 as shift 62. This in turn shows how the rotary valve 100 percent open timing angles can be varied to obtain any value from no load to full load control of engine outputs.

With regard to the specific structure of the rotary valve 10 reference is made to FIG. 6 wherein a top partial cross sectional view of the four cylinder version sleeve type multi-ported rotary valve assembly 10 is shown. The valve comprises a hollow sleeve or tubular construction 64, isometrically shown in FIG. 5. This rotor 64 has a circular cylindrical inner spaced portion 66 which is effectively hollow in that it has no axle or spoke obstruction to flow. A plurality of mid length inlet apertures 68 are disposed in spaced relation to one another about the outer peripheral surface of the rotor 64. Four axially oblong outlet apertures 70 are disposed both angularly and axially in spaced apart relationship to one another around the perimeter of the rotor 64 and adjacent to outlet passages 72 and are arranged for a one-three-four-two firing order, wherein the apertures 70 will periodically communication between the central space 66 and the four identically shaped entrances to outlet passages 72.

The rotary valve body 67 would take the place normally occupied on a conventional multi-cylinder engine by what is now generally referred to as the intake manifold. This valve body 67 would resemble the intake manifold in appearance and function since it would be the support for the carburetor 18 (or air metering unit if fuel injection is used), and would have passages connecting its central body to each of the poppet intake valve or crank case entry ports. However, numerous differences would of course occur in structure and function between the rotary valve generally indicated as 10 in the present invention and that of the intake manifold.

In order to keep the diameter of the rotor 64 to an economic minimum thus reducing the rubbing velocity and the rotary movement of inertia to as low values as feasible, the outlet apertures 70 from the rotor 64 entering the valve body passages 72 will be elongated in the axial direction. The ratio of axial to tangential dimension will be nominally 2 and one-half to 1, with the long edges parallel to each other and the axis of the rotor 64 and with the "following" or cutoff edges exactly cut at the correct cutoff angle on 90 degree spacings. The short sides of passage openings will be in parallel planes at right angles to the axis of the rotor 64. The passages 72 in valve body 67 will transform from these rectangular openings to match the intake valve or crank case port openings which are usually more curcular or square for material and flow economy reasons. The carburetor 18 would mount on a standard flange near the center of the rotary valve body 67. The passage connecting the carburetor throat outlet will "transize" to a ring shaped passage 74 in the valve body 67 which will encircle the rotor 64 and, via the rotor inlet apertures 68, provide continuous free communication of flow from the throat of the carburetor into the interior 66 of the rotor 64. The rotor 64 will have no central axle except the short drive shaft 12 to which is connected and which bears the driving pulley 14. The rotary valve body 67 is designed so that the cylindrical bore can machined, broached or bored straight through and if necessary honed to a fine internal surface. One end will be sealed with a simple plug 76 and the other end will be sealed with a plate 78 which will be bushed as at 80, or provided with other bearings for supporting the rotor drive shaft 12. This will be accurately centered and assembled rigidly to the end of the valve body 67 with the anti-friction thrust washers 82 between the end of the rotor 64 and the plate 78, and between the plate 78 and the driven pulley 14. A shaft seal may be used at this area if found necessary. The shaft 12 and the rotor 64 will be connected with a flange on the shaft 12, or other torsionally rigid member at right angles to the rotor axis. The cylindrical outer surface of the rotor 64 will bear on the inner cylindrical surface of the valve body 67 and carry the transverse loads created by the timing belt 16 forces and the differential gas pressure forces between the inside passage 66 of the rotor 64 and the port passages 72, when the port passages are blocked off. A rotary valve body such as 67 for a V-8 engine would have two rows of four outlet passages 72, with 135° angle between the rows.

As best shown in FIG. 8, the modified carburetor 18 used with the structure of the present invention represents only the first stages of change which should be incorporated in the overall field of possibilities opened up by this invention. It shows that a tube 84 brings average vacuum from ports 15 in rotary valve body 67 to the carburetor and other uses 85. A tube 86 connects this vacuum to the carburetor to what is known as the power jet or economizer function, and the time differential of vaccum to what is known as the accelerator pump 88 which would still be required functions as in the present day carburetor. FIG. 8 further shows that the conventional choke 90, venturi 92, float valve and bowl 94, air bleed 96, fuel orfice 98 and air bled discharge nozzle 100 would all be retained. However, with the advent of low cost electronic measuring and control devices along with low cost micro logic digital programmers and computers, most, if not all of the above mechanical components can be replaced by use of "static" electronic and optical devices to sense and control optimum air-fuel ration to the engine, under any and all conceivable operating conditions. A completely closed no-moving-parts fuel delivery channel is possible starting at the fuel source and terminating at the passages 72 into the poppet intake valve or crank case inlet ports. All of the relevant parameter monitoring information needed for optimized control, even including the resulting values of air pollutant levels in the engine exhaust can be combined algorithmically into one properly varied signal to regulate the instantaneous optimum fuel flow rate into the engine. Simply stated, this invention makes possible the elimination of the "throttle" function 97 and the miniature, sub-carburetor known as "idle jet" function 99, from the present day carburetor, and the necessity to consider them in air-fuel system designs for the future.

FIGS. 9 and 10 plot poppet intake valve, rotary intake valve and port openings versus linearized crankshaft angular position for a typical 4-stroke cycle and a typical 2-stroke cycle engine, respectively.

In FIG. 9 the poppet exhaust valve opening curve 102 is shown dotted, for reference only. The poppet intake valve opening curve 104, when considered in relation to the rotary intake valve opening curve 106, shows that there is little overlap, or serial passageway available for flow in the idle position, centered on 58. At the other limit of the rotary valve phasing, angle 60 later and centered on 58' however, the rotary valve opening curve 106' is centered on the poppet intake valve opening curve 104. This means that they are both 100% open at the same time, allowing full load to be developed by the engine. Since the angle 60 is controllable by the driver or operator, any load from zero at idle to full load can be readily selected.

In FIG. 10 are shown two groups of events in conventional two-stroke cycle engine operations, plus a third group using the variably timed rotary crankcase inlet valve. The piston ported type crankcase inlet action 108 is shown centered on piston top dead center (TDC=0°), while the curves 110 and 110' show the effective opening of a reed type valve as throttled by the conventional carburetor at idle (110) and unthrottled (110') at full load. Centered around piston bottom dead center (BDC=180°) are the cylinder exhaust portion opening 112 and the cylinder inlet port opening 114; these (112, 114) would not be changed by the application of the proposed variably timed rotary crankcase inlet valve to the 2-stroke cycle engine.

The events shown at 0° TDC in FIG. 10 would be replaced by those shown at 360° TDC region, with the application of the proposed variably timed rotary crankcase inlet valve and non-throttled carburetor. The rotary valve opening curve 116 would produce idle operation; when the control mechanism has retarded the rotary valve opening curve by angle 62, the rotary valve opening curve 116' would be approximately centered on TDC, as the port type valve opening 108 is at present. The reason for saying aproximately is that there may be better positions for full load operation than TDC, which the present practice is forced to use.

FIG. 11 shows a low-pressure or "light-spring" pressure-volume diagram of a conventional 4-stroke cycle, "throttled" spark ignition engine at approximately half load. The crosshatched area 118 represents "negative work" or "pumping loss", since it is traversed in a counter-clockwise direction. The upper port of the curve, traversed in a clockwise direction is called "positive work"; in this case it is not complete or closed, since it is relatively unimportant to this discussion as will be explained later.

FIG. 12 is the same kind of P-V diagram for a "nonthrottled" 4-stroke cycle, spark ignition engine, equipped with the variably timed rotary inlet valve invention herein described, showing the greatly reduced "negative work" area 120 which can be expected. Again, the upper portion of the curve is not closed, since its only significance is that the difference in the areas of the two upper "positive work" curves would necessarily be equal to the difference in areas of the two lower curves which are closed. This is true because the energy output of the engine (the same ½ load in each case) is equal to the positive work area minus the negative work area. So, for a given energy output, the lower the negative work can be, the lower the input energy (positive work) can be. The input energy of course, comes from the fuel put into the engine, therefore the saving or reduction of "negative work" causes a direct reduction in the fuel input for a given energy output requirement. Since engine efficiency is obtained from the ratio of output energy divided by the input energy, the reduction in fuel input for a given output means the engine will operate more efficiently. In automotive parlance this means it will give more "miles per gallon"; in stationary engines driving generators, more kilowatt hours per cubic foot of gaseous fuel.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

Now that the invention has been described,
What is claimed is:

1. An internal combustion engine having a driven shaft operable in fixed rotational relationship with a driving shaft, of the type having a phase shift mechanism for varying the angular relation between said shafts, and of the type having a valve assembly operably interconnected with said phase shift mechanism for modulating fluid flow, on a time-duration basis, from a fuel mixture feed to a cylinder intake means of said engine, wherein the improvement comprises,
  a non-rotatable connector means,
  a rotatable rotor means,
  a non-rotatable valve passage means,
  said connector means, rotor means and valve passage means serially connected to one another and disposed in fluid flow regulating disposition between said fuel mixture feed and said cylinder intake means,
  a drive element means connected in driven relation to the driving shaft of the engine and in driving relation to said rotor means,
  said drive element means disposed to define a path of travel between said driving shaft and said rotor means,
  said phase shift mechanism comprising a line-of-centers defined by an imaginery line extending substantially between the respective axes of rotation of said driving shaft and said rotor means,
  a phase shift assembly interconnected to said drive element and movably mounted relative thereto for selective positioning of said path of travel relative to said line-of-centers to achieve the continuous modulation of said fuel mixture flow to said cylinder intake means and thence to the engine cylinders, and
  said phase shift assembly further comprising an independently formed control assembly, independently movably disposed on one side of said line-of-centers and interconnected to said drive element, a tension assembly independently formed relative to said control assembly, said tension assembly independently movably disposed on the opposite side of said line-of-centers relative to said control assembly to selectively control disposition of said path of travel relative to said line-of-centers upon selective manipulation of said control assembly.

2. The engine of claim 1, wherein said drive element is formed from a flexible, substantially non-extendable material so that the overall length of said path of travel is not significantly changed during operation of said phase shift mechanism, said control assembly and said tension assembly being independently formed and independently movable relative to one another so that no length variation of said drive element need occur upon selective disposition of said control assembly.

3. The engine of claim 2 wherein said phase shift assembly comprises
  a first pulley mounted on said preselected driving shaft,
  a second pulley secured to said rotor means so as to rotate therewith,
  said control assembly comprising a control pulley,
  said tension assembly comprising a tension pulley,
  said drive element rotatably engaging each of said first, second, control and tension pulleys along spaced apart portions of the length thereof to at least partially define said path of travel of said drive element,
  said first, second, control and tension pulley rotatably engaging said drive element along its inner periphery, said pulleys thereby being disposed in surrounded relation to said drive element so that no reverse bending of said flexible drive element is required throughout its path of travel, thereby extending belt life, and so that the sum of the included angles of wrap defined by said path of travel does not exceed 360°.

4. The engine of claim 3 wherein said control pulley is moveable in a direction substantially transverse to the line-of-centers and thereby disposed to position a major portion of said path of travel on a predetermined side of said line-of-centers, said positioning serving to regulate the relative rotational angular orientation of said rotor means during operation of the engine dependent upon the desired power output of the engine, said power output being dependent upon the effective compression ratio as determined by the instantaneous position of the control means, said transverse motion of said control pulley effecting a like-directional, following motion of said tension pulley, said following motion effecting a displacement of said tension pulley different from the displacement of said control pulley so that no change in length of said drive element need occur upon selective disposition of said control assembly.

5. The engine of claim 4, wherein the displacement of the control pulley may be about a pivotal axis or in a linear direction, and wherein the displacement of the tension pulley may be about a pivotal axis or in a linear direction, and wherein any combination of pivotal or linear displacement of said independently formed control and tension pulleys may be provided thereby enhancing the flexibility of installation of the inventive assembly.

6. The engine of claim 5, wherein said engine is a four stroke cycle engine.

7. The engine of claim 6, wherein said fuel mixture feed is a carburetor means having no throttle plate in that said rotor means and valve body means obviates the need therefore, said carburetor means having a vacuum-operated acceleration pump and economizer valve.

* * * * *